(12) United States Patent
Kieltyka et al.

(10) Patent No.: US 9,602,902 B2
(45) Date of Patent: Mar. 21, 2017

(54) SPEAKER MOUNTING ASSEMBLY

(71) Applicant: Bogen Communications, Inc., Mahwah, NJ (US)

(72) Inventors: William Kieltyka, East Winthrop, ME (US); Thomas Nelson, West Milford, NJ (US); Allen Boothroyd, Cambridge (GB)

(73) Assignee: Bogen Communications, Inc., Mahwah, NJ (US)

( * ) Notice: Subject to any disclaimer, the term of this patent is extended or adjusted under 35 U.S.C. 154(b) by 30 days.

(21) Appl. No.: 14/621,469

(22) Filed: Feb. 13, 2015

(65) Prior Publication Data

US 2016/0241939 A1 Aug. 18, 2016

(51) Int. Cl.
| | | |
|---|---|---|
| *H04R 1/02* | (2006.01) | |
| *F16B 2/18* | (2006.01) | |
| *F16M 13/02* | (2006.01) | |
| *H04R 1/32* | (2006.01) | |
| *H04R 1/34* | (2006.01) | |

(52) U.S. Cl.
CPC ............. *H04R 1/026* (2013.01); *F16B 2/18* (2013.01); *H04R 1/025* (2013.01); *F16M 13/022* (2013.01); *F16M 2200/022* (2013.01); *H04R 1/323* (2013.01); *H04R 1/345* (2013.01); *H04R 2201/021* (2013.01); *H04R 2201/025* (2013.01); *H04R 2201/029* (2013.01)

(58) Field of Classification Search
CPC .......... H04R 1/02; H04R 1/025; H04R 1/026; H04R 1/323; H04R 1/345; H04R 2201/021; H04R 2201/025; H04R 2201/029; F16M 11/10; F16M 2200/022; F16M 13/022; A47F 5/0807; A47F 5/0815; A47F 5/0823; A47F 5/083; A47F 5/0838; A47F 5/0846; A47F 5/0853; A47F 5/0861; A47F 5/0869; A47F 5/0876; A47F 5/0884; A47F 5/0892; F16B 2/18

See application file for complete search history.

(56) References Cited

U.S. PATENT DOCUMENTS

| 238,672 A | * | 3/1881 | Galt | ................... B62D 33/0625 248/299.1 |
| 407,340 A | * | 7/1889 | Faries | ................... F16M 11/10 211/96 |

(Continued)

*Primary Examiner* — Curtiz Kuntz
*Assistant Examiner* — Joshua Kaufman
(74) *Attorney, Agent, or Firm* — Collard & Roe, P.C.

(57) ABSTRACT

An assembly for mounting a speaker to a surface includes a bracket having an elongated arcuate section and two end sections angled approximately perpendicular to the arcuate section. The end sections are attached on opposite sides of a speaker. A support device is provided, having a main body with a central channel, and channel guides running along each side of the central channel. The channel guides slidably retain the arcuate section of the bracket in the channel when the bracket is slid into the channel under the channel guides. A clamp is connected to the main body for clamping the bracket in place within the channel. A speaker can be mounted to the surface by attaching the bracket to the speaker, attaching the support device to the surface, sliding the bracket into the channel and moving the clamp to the locked position to lock the bracket in place.

12 Claims, 5 Drawing Sheets

(56) References Cited

U.S. PATENT DOCUMENTS

| | | | | |
|---|---|---|---|---|
| 829,084 A * | 8/1906 | Northrop | B05B 15/062 248/299.1 |
| 1,031,839 A * | 7/1912 | Cochran | F16M 11/10 248/126 |
| 1,338,781 A * | 5/1920 | Levy | H04M 1/04 248/299.1 |
| 1,358,159 A * | 11/1920 | Kern | B60R 1/06 248/214 |
| 1,965,668 A * | 7/1934 | Ringwald | H02K 5/26 248/299.1 |
| 2,037,435 A * | 4/1936 | Reichenbach | F21S 6/003 174/70 R |
| 2,277,253 A * | 3/1942 | Pollinger | A47F 7/08 211/37 |
| 2,840,332 A * | 6/1958 | Slutzky | F21V 21/26 248/124.1 |
| 3,650,503 A * | 3/1972 | Seidel | F16M 11/10 248/285.1 |
| 4,325,529 A * | 4/1982 | Seebinger | F16B 2/08 248/218.4 |
| 7,883,065 B2 * | 2/2011 | Nelson | F16M 11/08 248/201 |
| 8,023,684 B2 * | 9/2011 | Wathen | H04R 1/025 381/386 |
| 8,087,629 B2 * | 1/2012 | Gotovac | F16M 11/10 248/126 |
| 8,724,842 B2 * | 5/2014 | Sumitani | H04R 1/026 248/299.1 |
| 8,948,436 B2 * | 2/2015 | Stewart, Jr. | H04R 1/026 381/332 |
| 2003/0174855 A1 * | 9/2003 | Hawkins | H04R 1/02 381/386 |
| 2004/0156523 A1 * | 8/2004 | Tuason | H04R 1/021 381/386 |
| 2004/0202346 A1 * | 10/2004 | Park | H04R 1/026 381/386 |
| 2005/0147270 A1 * | 7/2005 | Hecht | H04R 1/026 381/386 |
| 2006/0285716 A1 * | 12/2006 | Gordon | H04R 1/06 381/386 |
| 2007/0025580 A1 * | 2/2007 | Reardon | H04R 1/025 381/387 |
| 2007/0075202 A1 * | 4/2007 | Gordon | F16M 11/043 248/289.11 |
| 2010/0051773 A1 * | 3/2010 | Wathen | H04R 1/025 248/314 |
| 2010/0314514 A1 * | 12/2010 | Nelson | F16M 11/08 248/219.1 |
| 2011/0228967 A1 * | 9/2011 | Kulchy | F16M 11/08 381/394 |
| 2013/0251187 A1 * | 9/2013 | Sumitani | H04R 1/026 381/387 |

* cited by examiner

SPEAKER MOUNTING ASSEMBLY

BACKGROUND OF THE INVENTION

1. Field of the Invention

This invention relates to an assembly for mounting a speaker on a flat surface such as a wall. In particular, the invention relates to an assembly for easily and adjustably mounting a speaker to a wall, particularly for outdoor use.

2. The Prior Art

Prior mounting systems for loudspeakers typically use only a mounting bracket (yoke) attached to the speaker. The yoke is attached directly to a surface, and the speaker is then aligned to holes in each end of the yoke, where bolts, screws, or knobs with threaded posts are inserted and tightened. This method requires the loudspeaker to be held in place while also inserting the threaded devices, properly aligning, then tightening them. Input connections are typically made with screw terminals or binding posts which require a wire to be inserted into a hole in a threaded post, then a clamping cap is screwed tightly to secure. Both of these methods require that the installer be able to visually view the connection point to properly insert the wires, and to identify the proper polarity of the wires. Installing speakers of this type can be cumbersome and time-consuming.

SUMMARY OF THE INVENTION

It is therefore an object of the invention to provide a speaker mounting system that can be used to mount speakers quickly and easily in all environments, by a single person. It is another object of the invention to provide a speaker mounting system that allows the speaker position be to be adjusted after the speaker is mounted, to allow for optimum sound distribution.

These and other objects are accomplished by a speaker mounting assembly comprising a bracket having an elongated arcuate section and two end sections angled approximately perpendicular to the arcuate section. The end sections extend in the same direction and are configured for attachment to a speaker, such as via screw holes. There is a support device having a main body with a central channel, and channel guides running along each side of the central channel. The channel guides are configured for slidably retaining the arcuate section of the bracket in the channel. There are also holes for attaching the main body to a surface via screws. To keep the bracket in the channel, there is a clamp pivotally connected to the main body. The clamp has an open position that allows the bracket to slide freely within channel, and a closed position that locks the bracket in place within the channel. A speaker can be mounted to the surface by attaching the bracket to the speaker, attaching the support device to the surface, sliding the bracket into the channel and moving the clamp to the locked position to lock the bracket in place.

In order to keep the clamp from pivoting into the unlocked position inadvertently, there is a locking screw configured for locking the clamp into the closed position. The locking screw extends through an aperture in a distal end of the clamp and through a hole in the main body. The locking screw is put into place after the bracket is mounted in the channel and the speaker is pivoted into the desired position.

To assist in connecting the speaker to an amplifier, the assembly can be configured with electrical connections. In one embodiment, an electrical wire with an input plug on one end and a connectors for connecting the wire to an amplifier on the other end can be mounted to extend through the support. The wire is connected to the amplifier behind the surface, and the input plug is connected to a speaker so that the speaker is powered by the amplifier. To assist in the assembly of the speaker to the mounting system, the plug is a keyed plug that can be placed blindly on the speaker in the correct position, and has a threaded collar for locking the plug onto the speaker and sealing out moisture.

In one embodiment, the clamp comprises a rotating cam connected via a post on the main body, such that in the locked position, the cam presses against a side of the bracket to force the bracket against the guide to prevent sliding of the bracket within the channel. A gasket seal can be arranged around the post to seal out water from the main body.

The invention also comprises a method for mounting a speaker to a surface, comprising:

attaching both ends of the bracket to the speaker so that the bracket spans the width of the speaker;

attaching the support to the surface;

sliding the bracket into the channel and underneath the guides;

positioning the speaker to a desired position by sliding the bracket within the channel; and locking the bracket in place.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
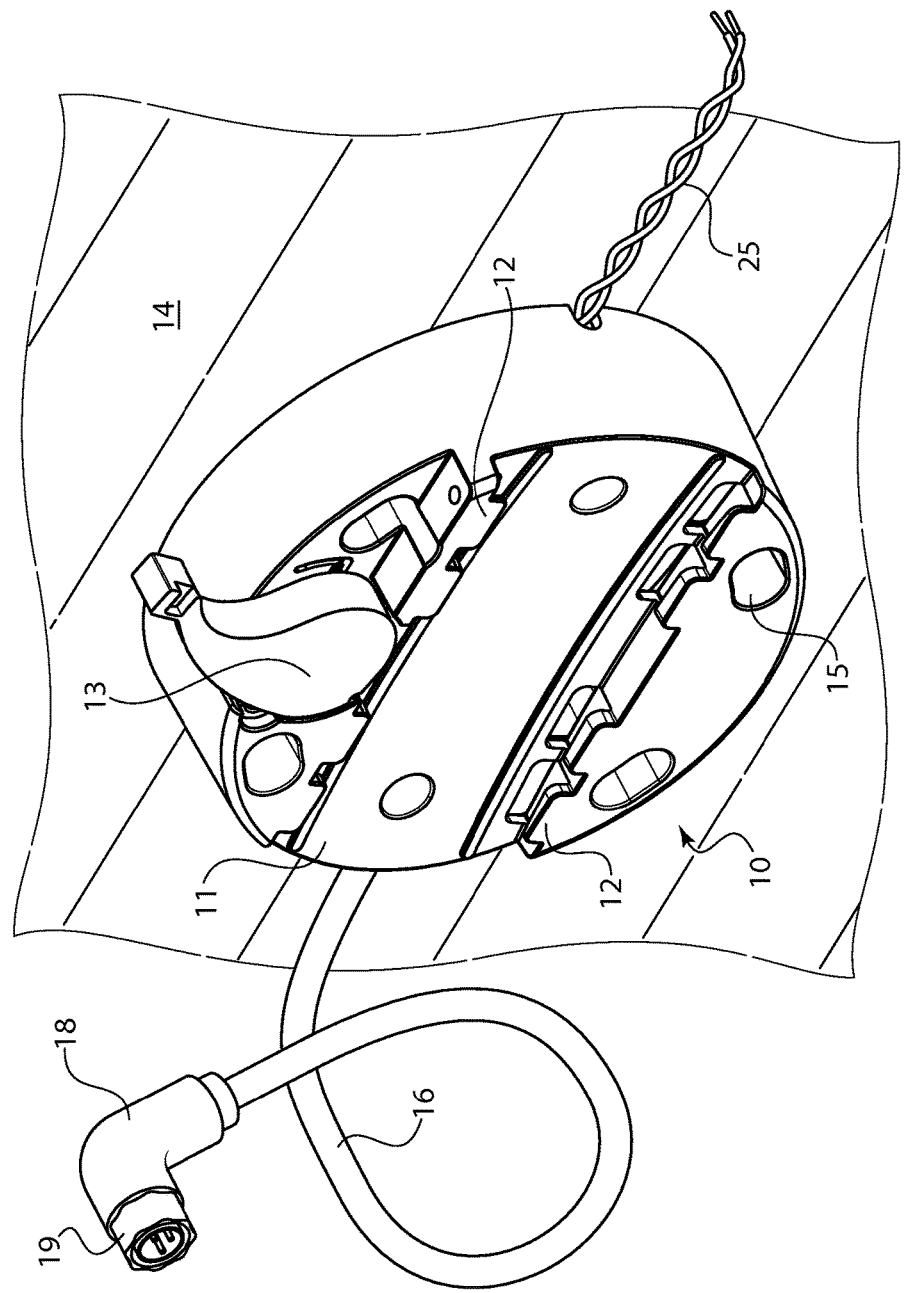
FIG. 1 shows the support structure with the connection plug running therethrough.

Referring now in detail to the drawings and, in particular, FIG. 1 shows the main body 10 of the support structure according to the invention. Main body 10 is formed of a circular platform having a central channel 11 with two longitudinal guides 12 on either side. A clamp 13 that is formed of a pivoting cam is attached to main body 10 via a post on main body 10. Main body 10 is attached to a surface 14 via any suitable means, such as screws, nails, adhesive, etc. Holes 15 are supplied in main body 10 to provide for the attachment to the surface 14.

A wire 25 is connected through main body 10 for attachment to an amplifier (not shown). The amplifier can be placed in a remote location, such as behind the surface. Wire 25 is connected to cord 16, which attachable to a speaker for connection of the speaker to the amplifier. Cord 16 can have a plug 18 for easy and removable attachment to a speaker.

Figure 2:
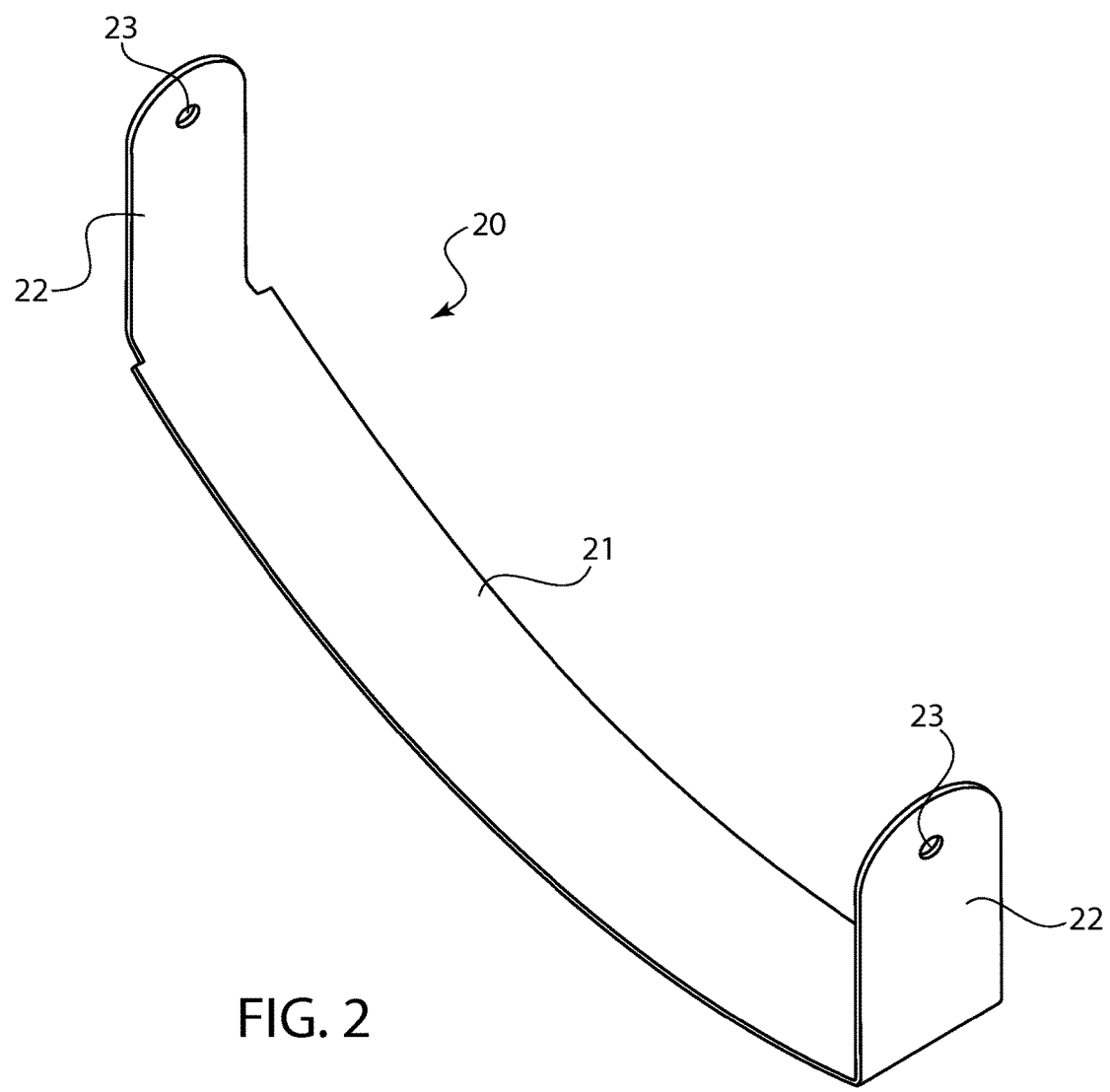
FIG. 2 shows the mounting bracket according to the invention.

FIG. 2 shows the mounting bracket 20 according to the invention. Mounting bracket 20 is formed from a central arcuate portion 21, with two perpendicular end portions 22. End portions 22 have a hole 23 to allow for attachment of bracket 20 to a speaker, such as via screws.

Figure 3:
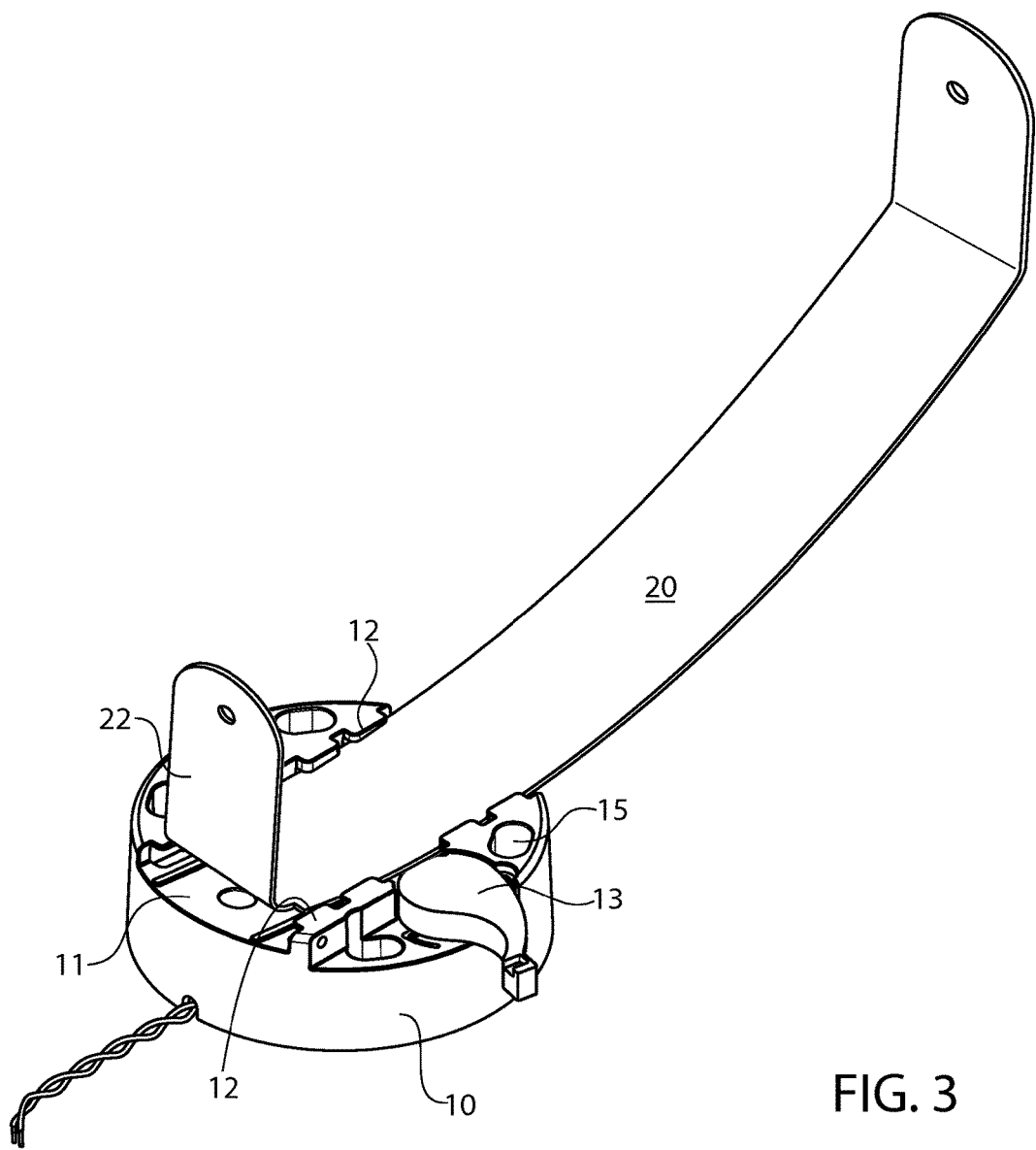
FIG. 3 shows the bracket being inserted into the support structure.
Figure 4:
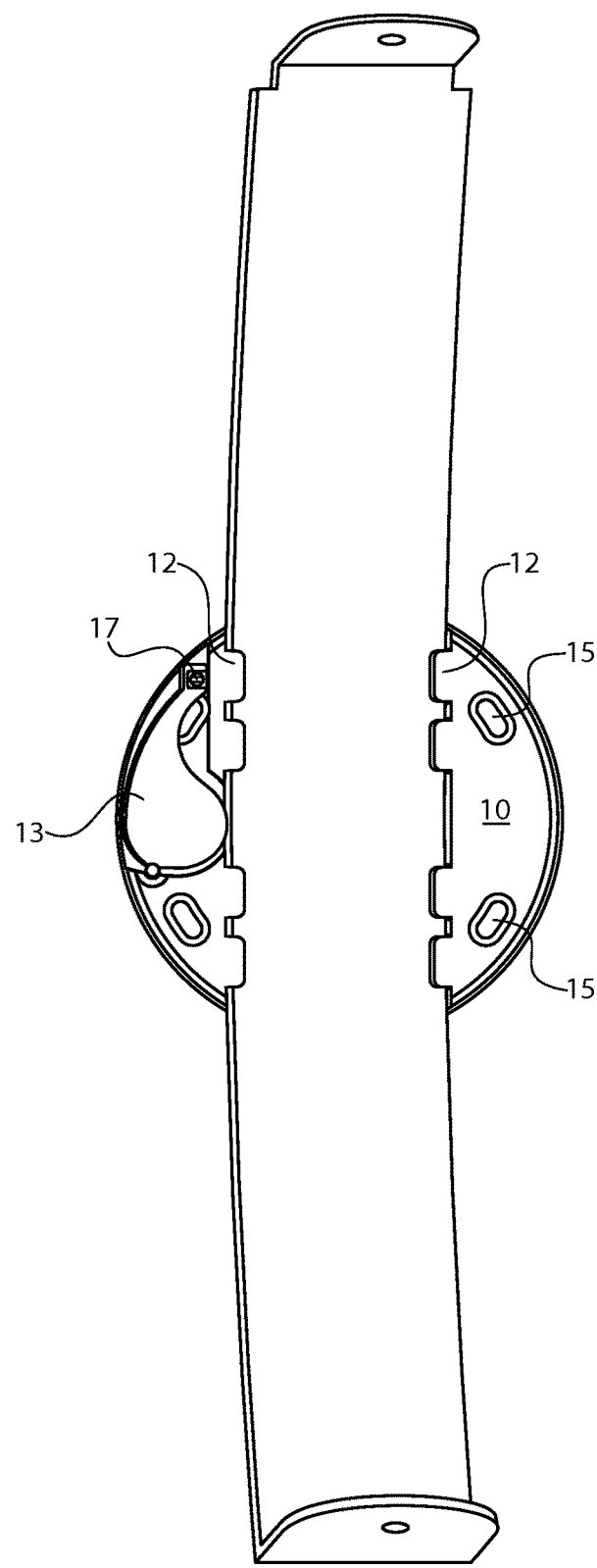
FIG. 4 shows the bracket mounted in the support structure.

FIG. 3 shows mounting bracket 20 being inserted into main body 10 underneath guides 12, so that mounting bracket 20 is slidably maintained within channel 11 of main body 10. In practical use, bracket 20 is mounted to a speaker first before being inserted into main body 10, as described below with reference to FIGS. 5 and 6. It is shown empty here for ease of illustration. After mounting bracket 20 is placed into its desired position, clamp 13 is pivoted into the locked position to lock bracket 20 in place, as shown in FIG. 4. A screw 17 is then placed through a hole in the end of clamp 13 and secured to main body 10 to securely lock clamp 13 in place. This way, bracket 20 and its attached speaker cannot move out of its desired position, even under stress. However, bracket 20 can be easily repositioned by removing screw 17 and rotating clamp 13 to the unlocked position shown in FIG. 3.

Figure 5:
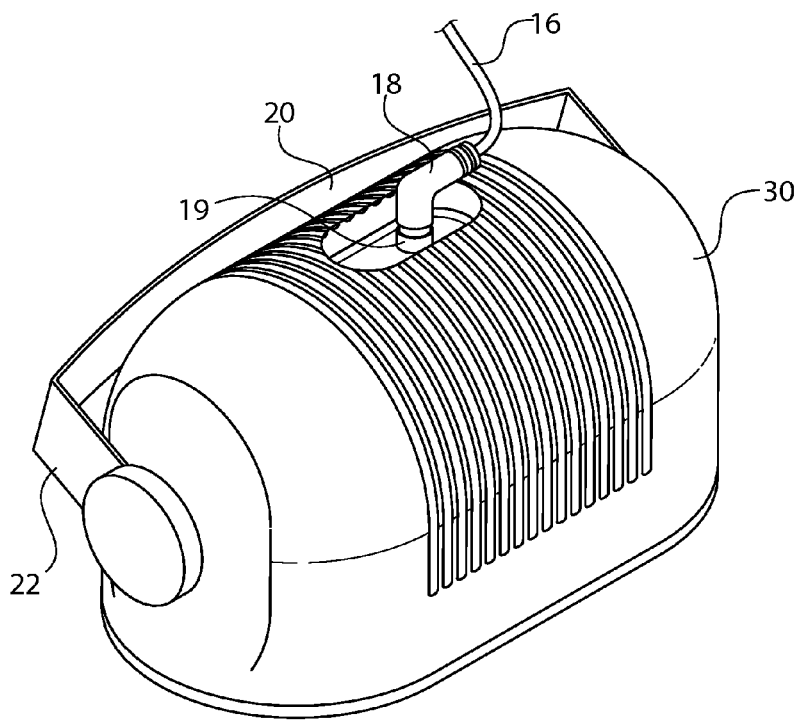
FIG. 5 shows the bracket mounted to a speaker.
Figure 6:
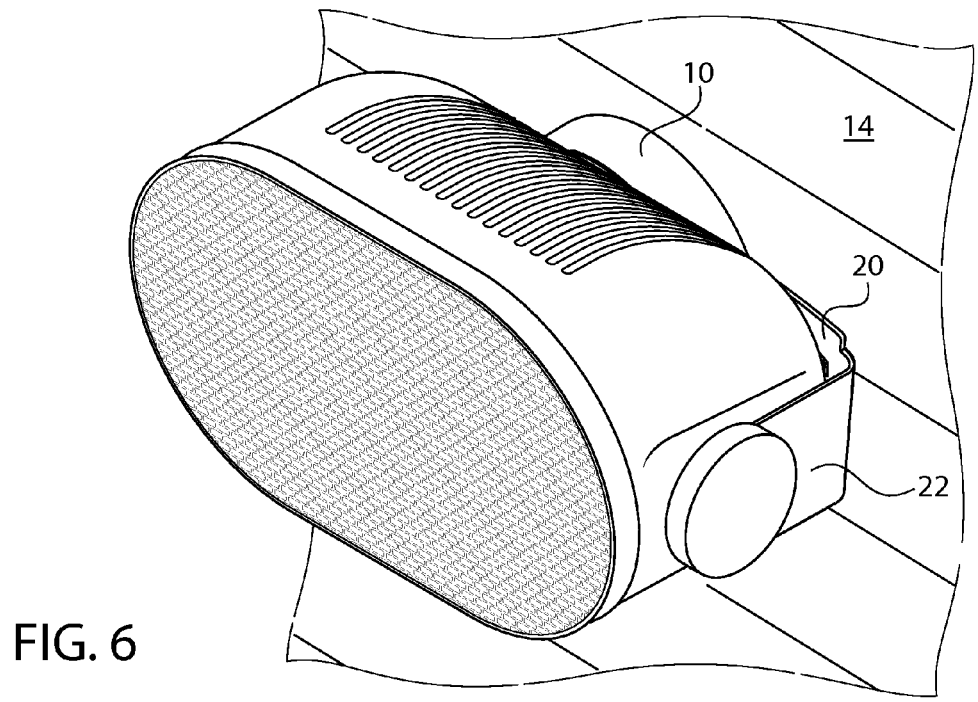
FIG. 6 shows the bracket with the speaker mounted to the support structure.

FIGS. 5 and 6 show a speaker 30 connected to ends 22 of bracket 20. This connection can be made by any suitable means, such as via screws though holes 23 (shown in FIG. 2). After bracket 20 is attached, cord 16 is attached to speaker 30 via plug 18 on cord 16. Plug 18 can be a keyed plug so that it can be blindly attached to speaker 30 without having to visualize the back of speaker 30. Plug 18 can also have a waterproof collar 19 to allow for outdoor use. After this connection is secure, bracket 20 is then slid into channel 11 of main body 10, as previously described. Once speaker 30 is in the desired position, clamp 13 is locked and screw 17 is inserted to lock speaker 30 in place. FIG. 6 shows speaker 30 connected to main body 10, which will have been previously mounted to a surface 14 prior to its connection to bracket 20. Thus, to mount speaker 30 to surface 14, all that is required is to slide the bracket 20 into channel 11 on main body 10 and lock clamp 13 in place. This can be easily done by one person without the need for complicated positioning or assistance. The speaker mounting assembly of the present invention is also well suited for outdoor use, as the electrical connection to speaker 30 can be sealed with collar 19 around plug 18.

Accordingly, while only a few embodiments of the present invention have been shown and described, it is obvious that many changes and modifications may be made thereunto without departing from the spirit and scope of the invention.

What is claimed is:

1. An assembly for mounting a speaker to a surface, comprising:
   a bracket having an elongated arcuate section and two end sections angled approximately perpendicular to the arcuate section, the end sections extending in the same direction and being attachable to a speaker;
   a support device comprising:
   a main body with a central channel, channel guides running along each side of the central channel, the channel guides being configured for slidably retaining the arcuate section of the bracket in the channel such that a flat surface of the bracket faces the channel and side edges of the bracket face the channel guides; and
   a clamp connected to the main body, said clamp having an open position that allows the bracket to slide freely within channel and a closed position that locks the bracket in place within the channel, the clamp comprising a rotating cam connected to the main body, such that in the locked position, the cam presses against one of the side edges of the bracket to force the bracket against the guide to prevent sliding of the bracket within the channel,
   wherein a speaker can be mounted to the surface by attaching the bracket to the speaker, attaching the support device to the surface, sliding the bracket into the channel and moving the clamp to the locked position to lock the bracket in place.

2. The assembly according to claim 1, further comprising a locking screw configured for locking the clamp into the closed position, the locking screw extending through an aperture in a distal end of the clamp and through a hole in the main body.

3. The assembly according to claim 1, further comprising an electrical wire with an input plug on one end and a connectors for connecting the wire to an amplifier on the other end, the wire extending through the support such that when the wire is connected to the amplifier and the input plug is connected to a speaker, the speaker is powered by the amplifier.

4. The assembly according to claim 3, wherein the input plug is a keyed plug and has a threaded collar for locking the plug onto the speaker and sealing out moisture.

5. A combination speaker and mounting assembly, comprising:
   a bracket having an elongated section and two end sections angled approximately perpendicular to the elongated section, the end sections extending in the same direction;
   a speaker connected to the end sections of the bracket;
   a support device comprising:
   a main body with a central channel, channel guides running along each side of the central channel, the channel guides being configured for slidably retaining the elongated section of the bracket in the channel such that a flat surface of the bracket faces the channel and side edges of the bracket face the channel guides, and holes for attaching the main body to a surface; and
   a clamp connected to the main body, said clamp having an open position that allows the bracket to slide freely within channel and a closed position that locks the bracket in place within the channel, the clamp comprising a rotating cam such that in the locked position, the cam presses against one of the side edges of the bracket to force the bracket against the guide to prevent sliding of the bracket within the channel;
   wherein the speaker can be mounted to a surface by attaching the support device to the surface, sliding the bracket into the channel and moving the clamp to the locked position to lock the bracket in place.

6. The assembly according to claim 5, further comprising a locking screw configured for locking the clamp into the closed position, the locking screw extending through an aperture in a distal end of the clamp and through a hole in the main body.

7. The assembly according to claim 5, further comprising an electrical wire with an input plug on one end and a connectors for connecting the wire to an amplifier on the other end, the wire extending through the support such that when the wire is connected to the amplifier and the input plug is connected to the speaker, the speaker is powered by the amplifier.

8. The assembly according to claim 7, wherein the input plug is a keyed plug and has a threaded collar for locking the plug onto the speaker and sealing out moisture.

9. The assembly according to claim 5, wherein the elongated section is arcuate in shape.

10. A method for mounting a speaker to a surface, comprising:
- attaching a bracket to the speaker, the bracket having end portions that are attached to opposite sides of the speaker, and an arcuate main portion extending between the end portions;
- attaching a support to the surface, the support comprising a main body with a central channel and guides extending along both sides of the central channel;
- sliding the arcuate main portion of the bracket into the channel between the guides such that a flat surface of the bracket faces the channel and side edges of the bracket face the guides; and
- locking the bracket in place via a clamp comprising a rotating cam attached to the main body, the cam rotating between an unlocked position and a locked position such that in the locked position, the cam presses against one of the side edges of the bracket to force the bracket against the guide and prevent sliding of the bracket within the channel.

11. The method according to claim 10, wherein the step of locking further comprising inserting a screw through the cam and into the main body to prevent the cam from rotating out of the locked position.

12. The method according to claim 10, further comprising attaching an input plug to the speaker, prior to the step of sliding, the input plug being connected to the main body and to an amplifier.

\* \* \* \* \*